United States Patent Office 3,513,369
Patented May 19, 1970

3,513,369
EXTENDED FOIL CAPACITOR
Walter F. England and Daniel Mannheim, Williamstown, Mass., and George E. Cormier, Barre, Vt., assignors to Sprague Electric Company, North Adams, Mass., a corporation of Massachusetts
Filed Apr. 8, 1968, Ser. No. 719,483
Int. Cl. H01g 1/14
U.S. Cl. 317—260                                    5 Claims

ABSTRACT OF THE DISCLOSURE

A convolutely wound capacitance section is terminated at each end by an end cap which carries a lead wire and has at least one aperture in its end wall. Conductive fusible material of each cap is flowed into bonding relationship with one edge of the electrode and within the aperture to provide a plug of the fusible material extending from the electrode to within the aperture.

BACKGROUND OF THE INVENTION

This invention relates to an extended foil capacitor and more particularly to a miniature plastic film capacitor having electrodes terminated in end caps which carry lead wires.

Miniature plastic film capacitors of the prior art such as described in U.S. Pat. 3,150,300 issued to Alvin L. Schils et al. are constructed with end caps which enclose each end of the section and are bonded to its extended foils. This construction provides miniature capacitors of uniform size having well aligned lead wires. However, the bond between the planar end wall and the extended foils is not open to visual inspection in this construction and is very dependent upon close process control. Consequently, the bonding of terminal caps of the prior art may be improved.

One object of this invention is to provide a film capacitor terminated in end caps which have improved bonding to the capacitor electrodes.

Another object of this invention is to provide a film capacitor having end caps which are keyed to the capacitance section by means of plugs of fusible material which are bonded to the electrodes and extend from them through the end cap.

A further object of this invention is to provide a film capacitor having an external visible indication of the bonding connection between the end cap and the extended foil of the capacitor section.

These and other objects of the invention will be more apparent by consideration of the following description and claims taken together with the accompanying drawing.

SUMMARY OF THE INVENTION

Broadly a plastic film capacitor constructed in accordance with the invention comprises a convolutely wound capacitance section having end cap assemblies, with lead wires secured thereto, mounted at either end of the section and bonded to electrodes thereof by conductive fusible material which is flowed into bonding relationship with the electrode and end cap and within an aperture of the end cap to form a plug of the conductive fusible material extending within the aperture.

In a more limited sense, an extended foil capacitor provided in accordance with the invention comprises a convolutely wound extended foil capacitance section having electrodes of conductive fusible material separated by a film of dielectric material with portions of alternate electrodes extended at each end of the section, an end cap is disposed at each end of the section, and the fusible electrode material is flowed into bonding relationship with each end cap and within at least one aperture of the end wall of the end cap to provide a plug of the electrode material extending therein.

DESCRIPTION OF THE PREFERRED EMBODIMENT

Figure 1:
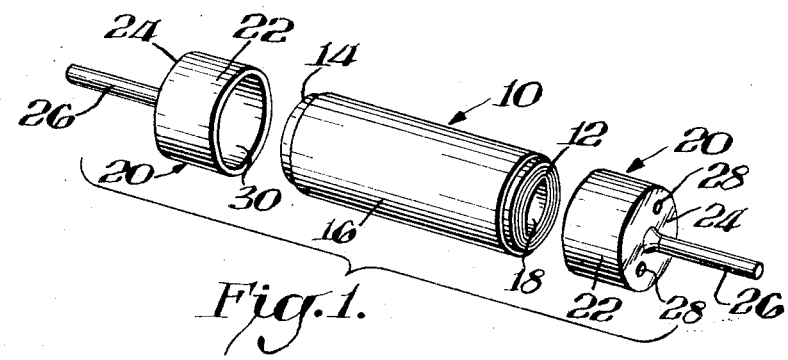
FIG. 1 is an exploded view in perspective of a capacitance section and terminal assemblies provided in accordance with the invention.
Figure 2:
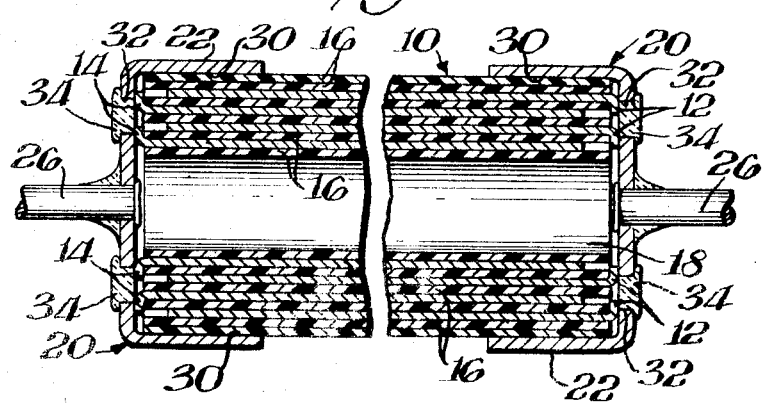
FIG. 2 is a view in section of a partially assembled capacitor provided in accordance with the invention.

FIGS. 1 and 2 show a convolutely wound capacitance section 10 having electrodes 12 and 14 wound in extended foil fashion with an interposed plastic film of dielectric material 16 which also provides an outer insulative cover of the section. Capacitance section 10 is of the extended foil type in which a pair of electrodes are convolutely wound in capacitive relationship with the edge of one electrode extending beyond the other electrode at one end of the section, and the second of the pair of electrodes extending in a like manner from the opposite end of the section.

As depicted in the drawing this invention finds particular use for capacitance sections of a low capacitance rating that require only a few turns of electrodes and dielectric material. Hence for ease in handling, particularly for ease in rolling these miniature sections on automatic equipment, the capacitance section takes the form of a tube having a large internal bore 18 relative to the thin electrically active wall.

Electrodes 12 and 14 may be any of the conventional electrode materials used in electrostatic capacitors such as metallic films deposited on a dielectric base or discrete metal foils. Preferably, however, electrodes 12 and 14 should be discrete foils of conductive fusible material such as alloys of tin and lead, for example 83% tin and 17% lead is suitable. Other alloy foils such as 96% lead and 4% tin, as well as 50% tin-lead foil are also suitble.

Similarly, dielectric material 16 may comprise any of the conventional dielectric spacers, however plastic films are preferred in this instance since these are not sensitive to moisture pickup and also may be employed to provide a bonding relationship between the outer layer of film and the end caps. In this regard, polyester, vinyl polymer and polycarbonate films, and more particularly polyethylene terephthalate and polystyrene films have been found to be suitable.

In the inventive unit, a cup shaped end cap 20 is provided at each end of section 10. Each end cap 20 includes a tubular side wall 22 and an end wall 24, and carries a lead wire 26 secured to end wall 24 of each cap by any conventional means such as welding, soldering, or swaging or the like. End wall 24 also carries one or more orifices or apertures 28 which extend through the wall into the internal bore 30 of the cup. Caps 20 may be of any suitable conductive material, such as brass or the like, which is coated or tinned with a conductive fusible material such as tin or the like.

In construction of the capacitor as shown in FIG. 2, caps 20 are pressed over each end of section 10 with its internal bore 30 in contact with outer layer 16 and with end wall 24 brought into electrical contact with the extended edges of foils 12 and 14 at the respective ends of section 10. Terminal 20 is thereafter secured to section 10 by any of the conventional soldering techniques known in the capacitor art.

In the preferred embodiment, resistance soldering is utilized to join the tinned terminals 20 to the fusible electrodes 12 and 14. In this case, each cap 20 is heated to flow the fusible material of the cap and the electrodes into a bonding relationship with some of the conductive fusible material flowing within apertures 28 so as to form a plug 32 of fusible material extending from the edge of the foils to within each aperture. Preferably, the conductive fusible material is flowed to the outside of the cap to form a rivet-like head arrangement 34, as shown. In both these arrangements, there is an improved bond and a visible indication of the solder flow. For purposes of illustration, only the rivet-like solder is shown, however, it should be understood that in actual practice solder is flowed over the electrode edges and a large portion of the inner wall of the cap, and in the preferred embodiment the electrode edges are not as clearly defined but are melted or flowed into bonding relationship with the cap and within the aperture.

Advantageously, plugs 32 in conjunction with apertures 28 greatly enhance the strength and durability of the capacitor terminations since this construction not only increases the bonding surface of the cap but also provides an interlocking arrangement due to the inclusion of flowed plugs within the end walls. This improved connection is more capable of withstanding stress normal to the cap end wall and bending moments applied to the cap. In addition, bond strength is further enhanced by an external flow of solder to the outside of the cap.

Additionally, plugs 32 which form the shank of rivet 34 provide dowel like extensions of the electrodes which greatly enhances the cap resistance to tortional or rotional forces. This makes this construction useful with radially extended leads as well as the axial leads of the prior art.

As indicated, section 10 is preferably constructed of fusible electrodes which contribute to the bonding of the end caps. Hence in the preferred embodiment, an additional length of exposed electrode is employed to provide sufficient fusible material to fill openings 28 and suitably join the end caps. For this construction, with a pair of .025 inch apertures in each end wall the section may be extended approximately 3/32″. Alternately, a heavy coat of fusible material may be employed on the end cap, and in some cases a solder preform may be included within the cap for use with units having electrode material which is not readily fusible.

Figure 3:
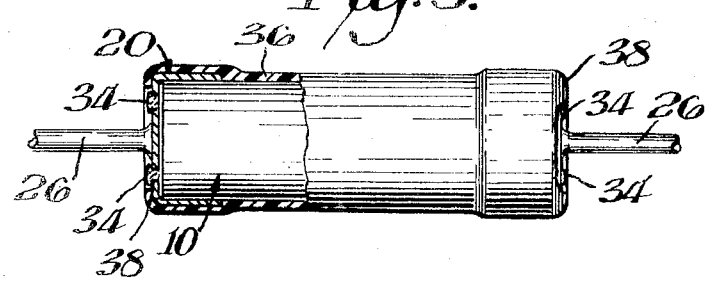
FIG. 3 is an elevational view partly in section of the completed capacitor.

The unit is completed, as shown in FIG. 3, by coating its outer diameter with insulative material of plastic or the like. This may be accomplished by dipping or spray coating or the like, however, in the preferred embodiment, a heat shrinkable film 36 such as irradiated polyethylene or the like is utilized. Film 36, which is originally slightly longer and of larger diameter than the section, is slid over and positioned around the section, and is then heated to cause it to shrink tightly against the section diameter and to curl over the outer ends of the end cap, as shown at 38. This further increases the pull strength of the end caps.

The following specific example is recited of a preferred emobidement of the construction and procedures for producing a film capacitor according to this invention, however, it should be understood that this example is for purposes of illustration only and should not be construed to be limitative beyond the scope of the appended claims.

Two strips of polyethylene terephthalate Mylar 5/16 inch wide and 0.0005 inch thick were rolled as spacers between two thin alloy foils (83% tin, 17% lead) 11/32 inch wide and .0004 inch thick on a .060 inch mandrel in an extended foil fashion with foil extensions of 3/32 inch on each end of the roll. A plastic film margin of 1/16 inch was provided beyond the non-extended or internal edge of each foil to leave an effective foil with a capacitive overlap of 1/4 inch. This construction was rolled to an outside diameter of .090 inch which resulted in an air core section having an inner diameter of .060 inch and a wall thickness of .015 inch. This construction produced a capacitance of 300 pfd.

The tubular capacitance section was cured for several hours to provide a rigid self-sustaining capacitance unit. Suitable curing is provided by heating the section for two hours at a temperature of at least 105° C. and two hours at a temperature of at least 125° C. Tinned brass end caps having an OD of .120 inch, an ID of .092 inch, a length of .060 inch and a pair of .025 aperture in each end wall were fitted on the ends of the cured section and secured thereto by resistance heating which affected a solder bond between the tin alloy foil extension and the tin coating of the end caps; with sufficient solder flowing within and through the apertures to provide plugs of the electrodes extending from the foils to within the apertures and a rivet-like head of solder on the outer surface of the cap. The units were then positioned within a heat-shrinkable sleeve of irradiated polyolefin and heated at 135° C. to shrink the tubing around the longitudinal axis of the capacitor and to produce a plastic insulative coating of .020 inch thickness.

Advantageously, end caps having radial leads may also be utilized in accordance with the invention. In this case, the outer insulative coating may be provided by dipping, coating, or spraying or the like with plastic material.

Many different embodiments are possible, of course. For example, one or more apertures may be provided in the cap, and solder may be flowed into or through the apertures to form rivet-like connections to the electrode edges. Also, many different types of materials may be employed for both the end caps and electrodes.

Hence, as many apparently widely different embodiments of this invention may be made without departing from the spirit and scope thereof, it is to be understood that the invention is not to be limited except as defined in the apended claims.

What is claimed is:

1. An extended foil capacitor comprising a convolutely wound capacitance section having a pair of conductive electrodes separated by a film of dielectric material, a cup shaped end cap disposed at each end of said section, each of said end caps coated with conductive fusible material and having at least one aperture in an end wall thereof, each cap secured to the ends of said section with said conductive fusible material in bonding relationship with the edge of one of said electrodes, and said fusible material extending through said aperture and forming a rivet-like head on the outside of said caps such that rivet-like plugs of said fusible material extend from said electrode edges to the outside of said caps.

2. The capacitor of claim 1 wherein said electrodes are of conductive fusible material, said electrodes are extended an additional length beyond said section to provide sufficient material to fill said apertures, and flowed portions of said extended electrodes are in bonding relationship with each cap and within said apertures.

3. The capacitor of claim 1 including a sleeve of plastic material tightly disposed around the assembly and curled over the ends of said end caps.

4. The capacitor of claim 1 including a plurality of apertures spaced around each of said end caps and filled with a plug of said fusible material.

5. The capacitor of claim 4 wherein said end caps carry a centrally located and axially aligned lead, and said apertures are substantially equally spaced around said lead.

References Cited

UNITED STATES PATENTS

| 2,455,136 | 11/1948 | Obert | 317—260 X |
| 3,150,300 | 9/1964 | Schils | 317—260 |
| 3,244,953 | 4/1966 | Walsh | 317—260 |
| 3,273,034 | 8/1966 | McGraw | 317—260 |

ELLIOT A. GOLDBERG, Primary Examiner

U.S. Cl. X.R.

317—242